C. K. LASSITER.
BOLT THREADING AND TURNING DEVICE.
APPLICATION FILED NOV. 22, 1910.

1,006,958.

Patented Oct. 24, 1911.
4 SHEETS—SHEET 1.

Fig. 1.

Witnesses
Fenton S. Belt
C. C. Hines.

Inventor
Columbus K. Lassiter

By Victor J. Evans
Attorney

C. K. LASSITER.
BOLT THREADING AND TURNING DEVICE.
APPLICATION FILED NOV. 22, 1910.

1,006,958.

Patented Oct. 24, 1911.

Witnesses
Fenton S. Belt
C. C. Hines

Inventor
Columbus K. Lassiter
By Victor J. Evans
Attorney

C. K. LASSITER.
BOLT THREADING AND TURNING DEVICE.
APPLICATION FILED NOV. 22, 1910.

1,006,958.

Patented Oct. 24, 1911.
4 SHEETS—SHEET 3.

Witnesses
Fenton S Belt
C. C. Hines.

Inventor
Columbus K. Lassiter

By Victor J. Evans
Attorney

UNITED STATES PATENT OFFICE.

COLUMBUS K. LASSITER, OF RICHMOND, VIRGINIA.

BOLT THREADING AND TURNING DEVICE.

1,006,958.

Specification of Letters Patent. Patented Oct. 24, 1911.

Application filed November 22, 1910. Serial No. 593,652.

*To all whom it may concern:*

Be it known that I, COLUMBUS K. LASSITER, a citizen of the United States, residing at Richmond, in the county of Henrico and State of Virginia, have invented new and useful Improvements in Bolt Threading and Turning Devices, of which the following is a specification.

This invention relates to a machine or device for automatically and simultaneously, or through a single, continuous operation, turning or finishing and threading the surfaces of bolt-blanks for the production of finished bolts.

Heretofore the work of turning or finishing the surfaces of bolt-blanks and forming the threads thereon has been performed by two separate and independent operations on different machines or by distinct mechanisms on a single machine.

The object of the present invention is to provide a machine by which the steps of turning and threading the bolt-blanks may be carried out in a single operation on one and the same machine and in a rapid and economical manner.

A further object of the invention is to provide a machine of this character which will operate upon different lengths and diameters of bolt-blanks and compensate automatically for variations between the turning and threading feeds due to differences of pitch of the threads in the use of fine or coarse threading dies at different times in the action of the machine.

A still further object of the invention is to provide a machine of this character which will operate upon blanks for both straight and tapered bolts.

With these and other objects in view, the invention consists of the features of construction, combination and arrangement of parts hereinafter fully described and claimed, reference being had to the accompanying drawings, in which:—

Figure 1:
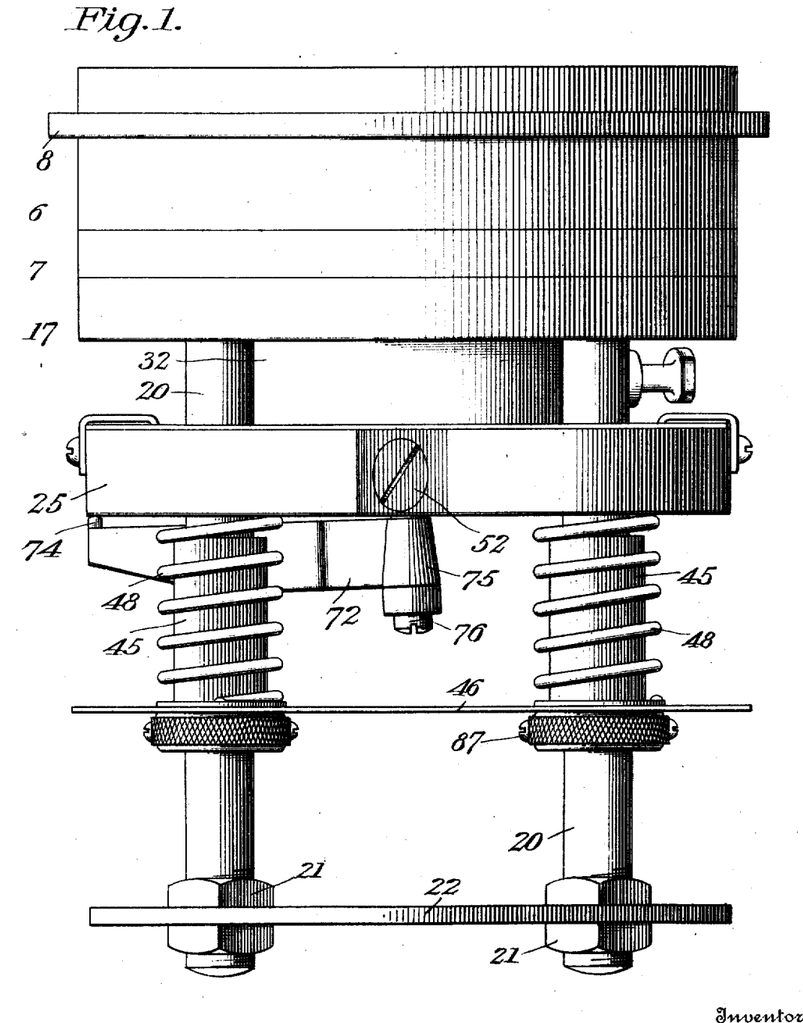
Figure 1 is a front elevation of a bolt turning and threading device embodying my invention.
Figures 12, 13, 14:
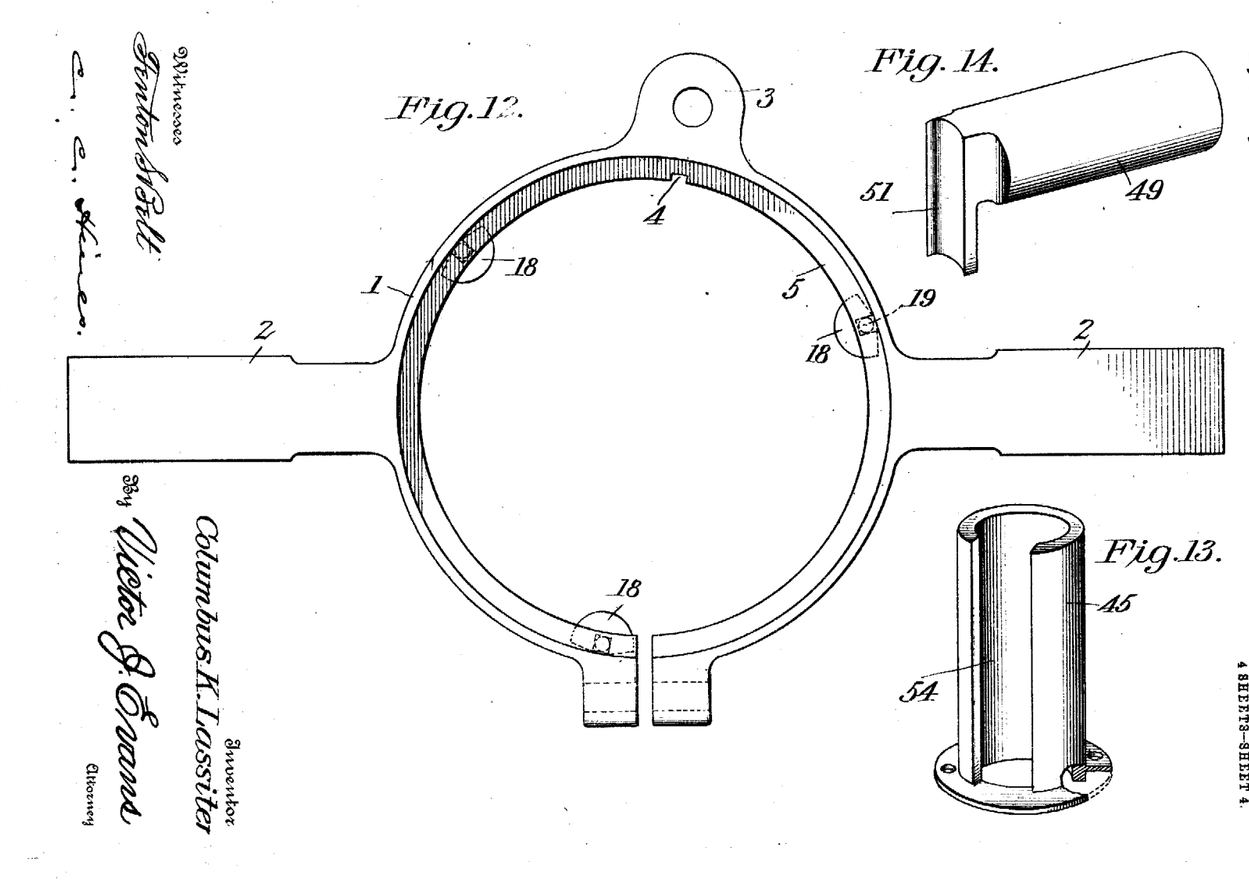
Fig. 12 is a top plan view of the main supporting ring.
Fig. 13 is a perspective view of one of the leveling sleeves.
Fig. 14 is a similar view of one of the retaining pins or plungers.

Referring now more particularly to the drawings, 1 designates a main frame ring or support for the operating parts of the device, which ring may be mounted in any preferred manner by radial arms 2 in a suitable frame structure and is provided at one side with a guide ear 3 and an internal keyway or groove 4 extending from the base of said ring upwardly to and intersecting an annular seat groove 5 formed in the top thereof.

Figures 2, 3, 4, 5, 17, 18:
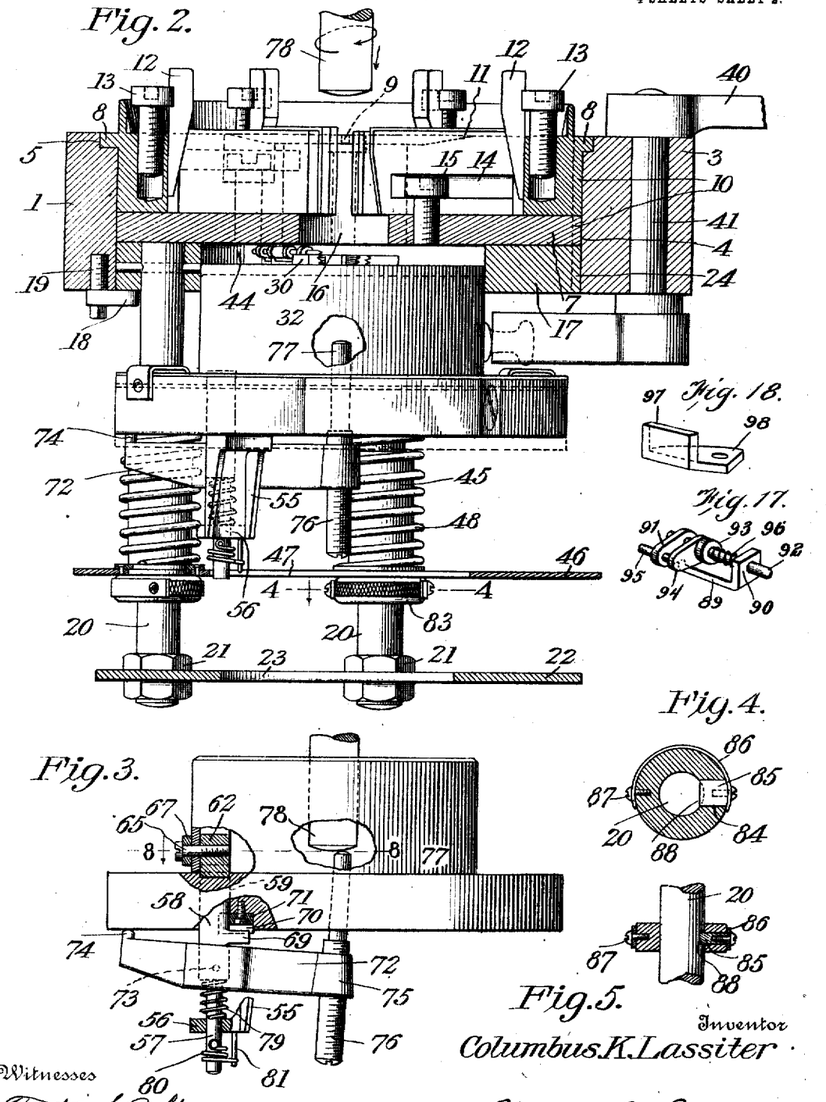
Fig. 2 is a central vertical section through the supporting parts and turning cutter thereof, showing the threading cutter in elevation.
Fig. 3 is a sectional elevation of the threading cutter and the die controlling devices associated therewith.
Fig. 4 is a detail section on line 4—4 of Fig. 2, showing the construction of one of the stop or gage collars.
Fig. 5 is a vertical transverse section of the same.
Fig. 17 is a detail view of the reducing cutter.
Fig. 18 is a similar view of the cam member for projecting the same.

Removably mounted in the upper portion of the frame ring or support 1 is a turning cutter head comprising an annular body portion 6 and a bottom plate 7, said body portion being provided with a laterally extending annular flange 8 to seat within the groove 5 and thereby support said head in position. The body portion 6 is closed at its base by the bottom plate 7 to which it is detachably secured by screws 9, both the body portion and bottom plate being provided with alining keys 10 to engage the keyway 4, whereby the turning head will be held from rotation in the frame ring and may be seated accurately therein in proper working position.

Arranged within the body portion 6 and supported by the plate 7 is a series of turning cutters 11, spaced at their inner or cutting ends and adjustable radially by means of vertically movable wedge keys 12 operated by adjusting screws 13, by which the cutting ends or edges of said cutters may be relatively disposed to provide an intervening passage of proper size for the downward feed of a bolt-blank of any diameter and to turn or finish the surface of the bolt on its feeding movement. Each cutter 11 is provided in one of its sides with a longitudinal groove 14 receiving the head of a screw 15 carried by the plate 7, the said head of the screw being arranged to bear against the bottom wall of the groove so that a desired friction may be instituted to prevent too free radial movement of the cutter, the screw also acting to hold the cutter against vertical displacement. The acting ends of the turning cutters are arranged above an opening or passage 16 in the plate 7, down through which the bolt-blank is fed.

The lower portion of the frame ring 6 receives the upper portion of the guide frame of a threading cutter, which guide frame comprises a ring 17 arranged to bear against the under side of the plate 7 and detachably held in position upon said frame ring by turn buttons 18 integral with turn screws 19 carried by the frame ring, which buttons bear against the under side of the ring 17 and may be swung outwardly to permit the same to be withdrawn from the frame ring. The ring 17 is suitably fixed to and connects the upper ends of an annular series of guide rods 20, preferably four in number, arranged at equal distances apart and coupled at their lower ends by nuts 21 to a lower ring or supporting member 22 having an opening 23 for the downward passage of the completed bolt therethrough. The ring 17 is provided with a key 24 to enter the lower end of the keyway 4, whereby it may be inserted with precision in the frame ring 1 and held from rotary movement.

The guide frame carries a threading cutter arranged for operation below the turning cutter and comprising a head formed with an annular base portion 25 and a reduced annular upstanding portion 26, said head being provided with a central vertical passage 27 arranged in alinement with the passage 16 for the downward feed of the bolt-blank therethrough. The portion 26 is formed with radial guideways 28 in which are slidably mounted adjustable blocks 29 carrying a series of threading dies or chasers 30. The outer ends of the blocks are provided with cam surfaces engaged by cam surfaces 31 on a cam ring 32 surrounding the portion 26, by which the threading dies may be adjusted radially inward to act upon different diameters of bolts, the blocks being in practice moved outwardly by individual springs 33 to retract the dies. The cam ring is normally maintained in die-retracting position by one or more springs 34 seated in grooves 35 therein, each spring bearing at one end against a shoulder 36 on the portion 26 and at its opposite end against an abutment screw 37 on the cam ring. When the cam ring is returned to normal position by the springs 34, after having been turned to project the dies, the cam surfaces 31 move out of contact with the blocks 29 and allow the springs 33 to retract the dies, thus freeing the threaded bolt for discharge.

Figures 6, 7, 8, 9, 10, 11, 15, 16:
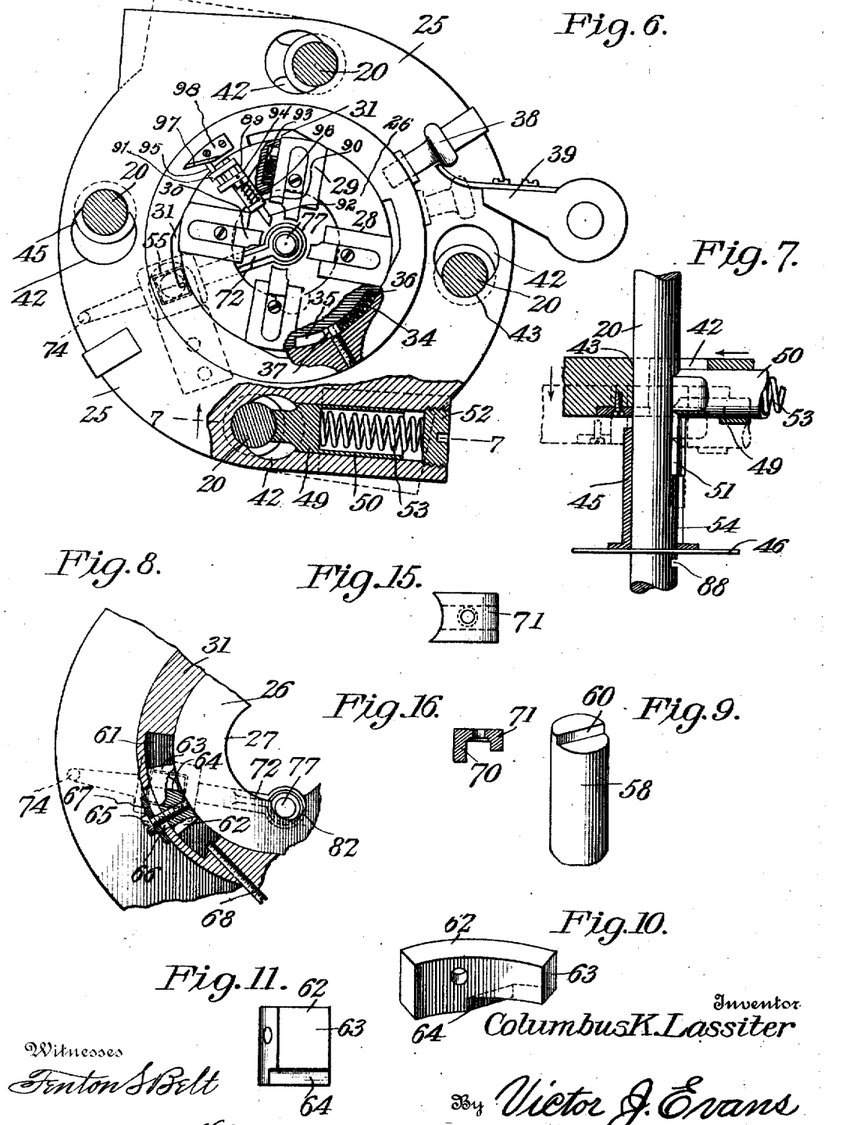
Fig. 6 is a top plan view, partially in section, of the threading cutter, showing in dotted lines the movements of certain parts.
Fig. 7 is a sectional view on the line 7—7 of Fig. 6.
Fig. 8 is a detail section on the line 8—8 of Fig. 3, showing the trip lever in retracted position and also showing the means for locking and releasing the cam ring whereby the threading dies are adjusted.
Fig. 9 is a detail view of the upper end of the locking pin.
Figs. 10 and 11 are detail views of one of the keepers or locking blocks.
Figs. 15 and 16 are detail views of the other keeper or locking block.

The cam ring is provided at one side with a radial stud 38 adapted to be engaged by the actuating arm 39 of a die closing lever 40 provided with a stem 41 journaled in the ear or projection 3 of the frame ring 1, the movement of the stud from die opening to die closing position being indicated in dotted and full lines in Fig. 6. The cam ring is adapted to be automatically locked when adjusted to die closing position, to be maintained in such position until the surface of the bolt-blank is threaded, and then to be automatically released for the retraction of the threading dies, as hereinafter fully described. The threading cutter head is mounted to have a floating or vertically yielding compensating movement on the guide rods 20, and to this end the base 25 thereof is formed with openings 42 for the passage of the rods, each of which openings is formed in one side with a segmental notch or seat 43. When the threading head is in normal position, the upper end of the cam ring enters the opening 44 of the ring 17 and is thus centered in position to accurately dispose the dies 30 to receive and grip the lower end of the bolt-blank as it passes below the turning cutters.

As shown, the openings 42 are of greater diameter than the rod, and are set eccentrically with relation to guiding and leveling sleeves 45 encompassing the rods below the head and fixed at their lower ends to a supporting ring 46 having openings for the passage of the rod and an opening 47 for the downward feed of the bolt. Surrounding the sleeves are coiled balancing or compensating springs 48 which bear against the under side of the base 25 of the threading cutter head and normally support said cutter head in the receiving position stated and permit a vertical yielding movement thereof under certain conditions in the threading operation hereinafter explained. When the cutter head is disposed in its normal receiving position it is held a short distance elevated above the sleeves 45 by the springs 48, but is permitted to have a limited preliminary downward movement until it contacts with the sleeves, as indicated in dotted lines in Fig. 2. By a limited oscillatory movement the head will be turned to bring the openings 42 into coaxial alinement with the sleeves, thus allowing the same to travel to a greater extent downward upon the sleeves against the resistance of the springs 48.

The oscillatory movement of the cutter head is controlled and regulated by sliding plungers 49 movable in openings 50 in the base 25 and provided at their inner ends with vertically disposed segmental presser feet or lugs 51 arranged within the openings 42 and bearing upon the rods. The bores 50 are closed at their outer ends by screw plugs 52 and each plunger is hollow to receive a coiled expansion spring 53 by which it is forced inwardly to cause the presser foot to bear upon the rod, the pressure of the several springs 53 serving to normally hold the portions 43 of the head in engagement with the rods and the openings 42 out of axial alinement with the sleeves 45, so that on the preliminary downward movement of the head the latter will engage the sleeves and will be held thereby against further downward movement until the head is turned against the resistance of the springs 53 to dispose the openings 42 in axial alinement with the sleeves. The presser feet 51 are of sufficient length to project below the cutter head and enter and move vertically in guide slots 54 in the leveling sleeves, thus preventing the head from being turned or oscillated too far in either direction and maintaining at all times a guiding connection between the sleeves and head in the vertical movements of the latter. The tension of the springs 53 may be regulated by adjusting the plugs 52.

Fixed to the underside of the base 25 is a depending bracket 55 having a horizontal arm 56 slidably supporting the lower reduced end 57 of a locking pin 58. This locking pin is slidably and rotatably mounted in a bearing opening 59 extending through the base 25 and is transversely cut away at its upper end to provide a locking finger or shoulder 60. This finger 60 enters a circumferential slot 61 formed in the cam ring 31 in which slot is arranged a locking block or keeper 62 having an end locking shoulder 63 and cut away on its under side to form a diagonally arranged inclined or cam surface 64. When the cam is turned to project the dies 30, the shoulder 63 of the block engages the finger 60 of the locking bolt 58, by which the cam is held from retrograde movement and the die is held projected for the threading operation. The block 62 is carried by a screw 65 movable in a slot 66 in the outer wall of the slot 61 and passing through a clamping plate or washer 67, by which the block may be adjusted in the slot to vary the throw of the cam ring and the locking action, so that the normal position of the dies may be changed to over or under thread bolt-blanks of a given size, or, in other words, to vary the depth of the threads as occasion may require. A screw 68 is provided upon the cam ring to gage and limit the extent of adjustment of the locking block. The locking pin is also provided with a lateral locking lug 69 to engage a flange or recess 70 at the lower end of a locking block or keeper 71 secured upon the under side of the base 25, to hold the pin from oscillatory movement while its finger 60 is in engagement with the shoulder 63.

A trip lever 72 is intermediately fulcrumed upon the lower end of the locking pin, as at 73, for pivotal movement in a vertical plane and has one of its arms extending outwardly and provided with a rounded lug 74 for rocking engagement with the under side of the base 25 and its other arm extending inwardly and formed with an internally threaded sleeve 75 receiving the lower threaded end 76 of a contact pin 77, which pin projects upwardly into the opening 27 so as to be engaged by the lower end of the feeding bolt-blank 78. A coiled spring 79 surrounds the portion 57 of the locking pin between the body portion of said pin and the bracket arm 56 and normally serves to force said pin upwardly. A second coiled spring 80, of the torsion type, surrounds the part 57 and is terminally connected with the same and an extension 81 from the bracket 55 and operates when the bolt is depressed and the cam turned to die-projecting position to swing said bolt and the trip lever laterally and thereby move the contact pin 77 into the path of movement of the bolt.

Milled stop and gage collars 83 are provided upon the rods 20 to support and limit the downward movement of the ring 46, leveling sleeves 45 and the threading cutter head, by which the floating movement of the cutter head will be restricted within determined limits sufficient to effect the threading of bolt-blanks of determined lengths. Each of these collars is formed at one side with a radial slot 84 receiving a correspondingly movable locking block or member 85 secured to one end of a substantially semicircular spring 86, fixed at its opposite end to the collar, as at 87. The block or locking member 85 is adapted to engage a transverse notch 88 in the rod to hold the collar from vertical or oscillatory movement. By, however, gripping and turning the collar with sufficient force, the inner end of the block will ride on the inner end of the slot as a cam surface and be forced outward or be retracted, permitting the collar to be released for adjustment. When so released the collars may be moved downwardly and seated upon the upper securing nuts 21, allowing the threading cutter head to have a greater range of vertical movement.

In the operation of the device, the bolt blank 78 is fixed at its upper or headed end in a chuck or feed device having a downward feed motion at a desired rate of speed and also adapted to impart a rotary motion at a determined rate of speed to the blank, after which time the lever 40 is operated to turn the cam 31 in the manner described to project the threading dies into engagement with the blank. As the blank feeds downward it first passes between the turning cutters 11 and its outer surface is turned or finished by the action thereof. The finished portion of the bolt passing below the turning cutters and through the opening 16 then enters the opening 27 in the threading cutter head between the dies 30. In this operation the movement of the cam to its prescribed position causes the shoulder 63 of the locking block 62 to engage the finger 60 of the locking pin 58, by which the cam will be held from retraction to hold the dies projected. The engagement of the bolt-blank by the threading dies causes the threading cutter to first move downwardly from its normal position under the feeding movement of the blank to the dotted line position shown in Fig. 2, by which the cutter head is brought into engagement with the upper ends of the sleeves 45 and leveled to cause the dies to grip the blank accurately to form a perfect and true thread. As soon as the head engages the leveling sleeves as described, the threading dies securely grip the bolt blank to start their threading action and the dies and cutter head are permitted to turn with the blank to the extent limited by the openings 42 and until said openings are brought into coaxial alinement with the sleeves 45, thus providing a compensating and vertical downward movement of the threading cutter to prevent any irregular action which might ensue under the combined downward and rotary motion of the blank if the threading cutter head were fixed against movement. The cutter head will then be controlled solely by the springs 48 and will be free to float or move vertically to compensate for any difference which may exist between the turning and cutting feeds.

It is preferred in practice to feed the blank at a fairly rapid speed through the machine in order to enable a comparatively large number of blanks to be finished and turned within a determined period of time. The turning cutters 11 will act efficiently upon the blanks at any rate of speed within reasonable limits, but it will, of course, be understood that the speed of action of the threading cutters on the blanks will vary according to the pitch of the threads to be formed, and that some provision must be made to compensate for the differences in the rate of turning and threading feeds when a fine or coarse thread is to be formed. If the thread is of such a pitch that the threading cutters will operate at the same ratio as the turning cutters or thread the blank as fast as it passes through the turning cutters, it will be understood that the threading cutter head will simply have its preliminary downward movement and partial rotary movement for a leveling and gripping action and will then remain stationary on the guide rods 20. If, however, the thread pitch should be comparatively fine, in which event the threading feed will be slower than the turning feed, the threading cutter will move downward on the guide rods against the resistance of the springs 48 to allow the blank to have its usual rate of downward feed motion, while increasing the rate of travel of the threading cutter for the threading action, thus compensating for a variation in the turning and threading feeds when the former is faster than the latter. When, on the contrary, the thread to be formed is of coarse pitch, in which event the threading cutters will operate as fast as the bolt is fed or at a higher rate of speed, it will be understood that the threading cutter will simply have its preliminary downward rotary motions for a leveling and gripping action and may then remain stationary or feed upwardly on the threads as it forms the same to compensate for the difference between the turning and threading feeds under such conditions. By this operation of making the threading cutter movable with relation to the turning cutter and instituting a compensating feed action of the character described, bolt blanks on which any desired pitch of thread is to be formed may be simultaneously turned and threaded in a single continuous operation and a comparatively large number of bolts finished within a determined period with much better results and at less cost than where the usual practice of turning and threading the bolts by two separate and independent operations is pursued.

As the blank 78 feeds downward through the opening 27 it contacts with the pin 77 and gradually depresses said pin and tilts the arm 72 of the trip lever downward. By this means the finger 60 and lug 69 are gradually drawn out of engagement with the shoulder 63 of the locking block 62 and the flange 70 of the locking block 71. The lever will be fully depressed by the blank against the resistance of the spring 79 at the end of the threading operation, so that said finger and lug will be fully retracted, thus freeing the cam ring 31 for return movement by the springs 34 to retract the threading dies and at the same time freeing the locking pin for rotary motion, so that under the pressure of the bolt on the pin 77 and through the action of the cam surface 64 of the block 62 on the finger 60 as the cam turns the trip lever will be turned laterally to swing the pin 77 out of the path of the bolt and into the receiving recess 82, allowing the bolt to pass downward through the openings 27, 47 and 23 without interference. When the bolt is in contact with the pin 77 on its downward feed, it will be understood that its tendency is to swing the pin laterally in the reverse direction, which operation would cause, if permitted, an oscillatory motion of the pin 58, by which the cam ring would be allowed to turn a slight distance back and forth and adjust the cutters to form an irregular or imperfect thread. To prevent this lateral motion of the pin 58, the locking devices 69 and 70 are provided, as will be readily understood. As soon as a new bolt is inserted in position and the cam ring turned to project the dies, it will be understood that the cam surface 64 will move out of engagement with the finger 60, and by the movement of the ring the shoulder 63 of the block 62 will clear the finger 60, whereupon the pin 58 will be free to be forced upward and turned by the springs 79 and 80 to adjust said finger into locking engagement with the shoulder 63 and swing the pin 77 into position to be engaged by the succeeding bolt, thus automatically resetting the trip mechanism for further operation.

It is desirable to provide a means whereby the end of the blank to be threaded may be reduced in diameter prior to the threading action, in order to allow the turned body of the blank to be subsequently turned down to a taper on a separate machine for the production of a tapered bolt. To this end I provide upon the portion 26 of the threading cutter head one or more turning cutters arranged between adjacent threading dies. In the present instance I have shown a single reducing cutter, although a plurality may be used, said cutter comprising a support 89 having front and rear guide pieces 90 and 91 perforated to form supports for a sliding turning tool 92, to which tool is fixed a stop collar 93 which limits its inward movement and a laterally projecting arm 94. The arm 94 carries a pin 95 movable in a guide opening in the guide piece 91, and a coiled spring 96 surrounds the cutter between the guide piece 90 and the collar 93 and serves to hold the cutter normally retracted. The stem 95 is adapted to be engaged by a cam member 97 carried by a bracket piece 98 secured to the upper face of the cam ring 32, whereby the reducing cutter will be projected when said cam ring is turned to project the threading dies. It will thus be seen that upon the downward passage of the blank beyond the turning cutters 11 the lower end of the blank will first be reduced to the desired extent by the reducing cutter 92 and the reduced portion threaded by the threading dies. The bolt thus produced will, therefore, have a threaded end of less diameter than the body thereof, allowing the body to be turned down to a desired taper by taper cutters on a separate machine.

I claim:—

1. A device for simultaneously turning and threading bolt-blanks, comprising a turning cutter, and a threading cutter arranged to operate upon the blank as it comes from the turning cutter, said threading cutter being movable relatively to said turning cutter to compensate for variations between the turning and threading feeds.

2. In a bolt-blank turning and threading device, the combination of a turning tool, a threading tool arranged to act upon the blank as it comes from the turning tool, means for supporting the threading tool for a floating motion relative to the turning tool, and means for automatically throwing said threading tool out of action.

3. In a bolt-blank turning and threading device, the combination of a turning tool, a threading tool arranged to act upon the blank as it comes from the turning tool, means for supporting the threading tool for a floating motion relative to said turning tool, and means adapted to be operated by the blank for automatically throwing said threading tool out of action.

4. In a bolt-blank turning and threading device the combination of a turning tool, a threading tool arranged to act upon the blank as it comes from the turning tool, means for permitting a relative motion between said turning and threading tools to compensate for variations between the turning and threading feeds, and means adapted to be operated by the blank for automatically throwing said threading tool out of action.

5. In a bolt-blank turning and threading device the combination of a turning tool, a threading tool arranged to act upon the blank as it comes from the turning tool, and means for supporting the threading tool for a floating motion relative to the turning tool.

6. In a bolt-blank turning and threading device the combination of a turning tool, a threading tool arranged to act upon the blank as it comes from the turning tool, and means for permitting a relative motion between said turning and threading tools to compensate for variations between the turning and threading feeds.

7. In a bolt-blank turning and threading device the combination of a turning cutter, a threading cutter arranged to operate upon a portion of the turned blank feeding through the threading cutter, and means for permitting the threading cutter to have movement toward or from the turning cutter to compensate for variations between the turning feed and the thread pitch.

8. In a bolt-blank turning and threading device, the combination of a cutter head provided with cutters to turn the surface of a feeding and rotating bolt-blank, a cutter head provided with collapsible dies to thread a portion of the turned surface of the blank while the remainder of said surface is being turned, means operative by the feeding blank for automatically throwing said dies in and out, and means supporting the threading cutter head for movement relative to the turning cutter head during the threading and turning operations to compensate for any variation between the turning and threading feeds.

9. In a bolt-blank turning and threading device, the combination of a turning cutter adapted to operate upon a feeding and rotating bolt blank, a threading cutter bodily movable relative to said turning cutter, and provided with dies for threading a portion of the blank while the turning operation is in progress, and spring means for supporting said threading cutter and permitting movement thereof.

10. In a bolt-blank turning and threading device the combination of a turning cutter, a spring supported floating threading cutter arranged to operate upon a portion of the turned blank, and while the turning operation is still in progress, and means controlled by the blank for automatically throwing said threading cutter out of operation.

11. In a device for simultaneously turning and threading a bolt-blank having a combined rotary and forward feed motion, the combination of a turning head, a spring supported floating threader arranged to operate upon a portion of the turned blank as it passes beyond the turning head and while the turning operation is in progress, and means for automatically throwing said threader out of action on the completion of the threading operation.

12. In a device for simultaneously turning and threading bolt-blanks, the combination of a relatively stationary turning cutter, a floating threading cutter arranged to operate upon a portion of the blank coming from the turning cutter, guides for said threading cutter, and supporting springs associated with said guides for permitting said threading cutter to move toward or from said turning cutter in the threading operation.

13. In a device for simultaneously turning and threading bolt-blanks, the combination of a relatively stationary turning cutter, a guide frame, a threading cutter mounted upon said frame for a floating movement toward and from said turning cutter, and means for normally maintaining said threading cutter in a stated position and permitting movement thereof away from said turning cutter.

14. In a device for simultaneously turning and threading bolt-blanks, the combination of a turning cutter, a guide frame, a threading cutter mounted upon said frame for movement toward and from said turning cutter and provided with collapsible dies, springs for supporting said threading cutter for a floating motion relative to said turning cutter, and means for automatically throwing the dies out of operation when the threading operation is completed.

15. In a device for simultaneously turning and threading bolt-blanks, the combination of a turning cutter, a guide frame, a threading cutter provided with collapsible dies and mounted upon said frame for movement toward and from said turning cutter, spring means for yieldingly supporting said threading cutter, and means for throwing the dies into and out of operation.

16. In a device for simultaneously turning and threading bolt-blanks, the combination of a turning cutter, a guide frame, a threading cutter provided with collapsible dies and mounted upon said guide frame for movement toward and from said turning cutter, means for setting the dies for a threading action, and means for automatically throwing the dies out of action upon the completion of the threading operation.

17. In a device for simultaneously turning and threading bolt-blanks, the combination of a turning cutter, a guide frame, a threading cutter provided with collapsible dies and mounted upon said frame for movement toward and from the turning cutter, spring means for yieldingly supporting the threading cutter, means for throwing the collapsible dies into and out of action, and means for variably limiting the reciprocating movement of the threading cutter.

18. In a device for simultaneously turning and threading bolt-blanks, the combination of a turning cutter, a guide frame, a threading cutter provided with collapsible dies and mounted upon said frame for movement toward and from said turning cutter, spring means for normally supporting the threading cutter and permitting movement thereof, means for setting the collapsible dies for operation, and means for automatically throwing the same out of operation.

19. In a device for simultaneously turning and threading bolt-blanks, the combination of a turning cutter, a guide frame, a threading cutter provided with collapsible dies and mounted upon said frame for movement toward and from said turning cutter, spring means for normally supporting the threading cutter and permitting movement thereof, means for setting said collapsible dies for operation, and means controlled by the feeding blank for throwing said dies automatically out of operation.

20. In a device for simultaneously turning and threading bolt-blanks, the combination of a turning cutter, a guide frame, a threading cutter provided with collapsible dies and mounted upon said guide frame for movement toward and from the turning cutter, springs for movably supporting said threading cutter, an adjusting device for setting the dies for action, locking means for holding the dies in set position, and means operated automatically by the feeding blank for throwing said locking device out of action and retracting said adjusting device and threading dies.

21. In a device for simultaneously turning and threading bolt-blanks, the combination of a turning cutter, a guide frame having leveling devices thereon, a threading cutter mounted for movement on said guide frame toward and from said turning cutter, said threading cutter being limited in outward movement by said leveling devices and adapted for a partial rotary motion to register with and travel on said devices, springs for yieldingly supporting the threading cutter in normal position and permitting outward movement thereof, and means for permitting limited rotary motion of the threading cutter.

22. In a bolt-blank turning and threading device, the combination of a turning tool, a threading tool arranged to act upon the blank as it comes from the turning tool, means for permitting said turning and threading tools to have relative movement to compensate for variations between the turning and threading feeds, and means for automatically throwing said threading tool out of action.

23. In a bolt-blank turning and threading device, the combination of a turning tool, a threading tool arranged to receive the blank from the turning tool and to thread a turned portion of the blank while the remainder is being turned, means adapting said threading tool for an automatic preliminary movement to accurate threading position, and means for thereafter permitting said threading tool to have movement with relation to said turning tool to compensate for any variation between the turning and threading feeds.

24. In a bolt-blank turning and threading device, the combination of a turning tool, a threading tool arranged to receive the blank from the turning tool and to thread a turned portion of the blank while the remainder is being turned, means adapting said threading tool for an automatic preliminary movement to accurate threading position, means for thereafter permitting said threading tool to have movement with relation to said turning tool to compensate for any variation between the turning and threading feeds, and means for automatically throwing said threading tool out of action.

25. In a bolt-blank turning and threading device, the combination of a turning tool, a threading tool arranged to receive the blank from the turning tool and to thread a turned portion of the blank while the remainder is being turned, means adapting said threading tool for an automatic preliminary movement to accurate threading position, means for thereafter permitting said threading tool to have movement with relation to said turning tool to compensate for any variation between the turning and threading feeds, and means adapted to be engaged and operated by the blank for automatically throwing said threading tool out of action.

26. In a bolt-blank turning and threading device, the combination of a turning cutter, a threading cutter provided with collapsible dies and mounted for floating movement toward and from said turning cutter, springs yieldably controlling the movements of said threading cutter, a device for adjusting the dies to threading position, a device for locking the adjusting device in such position, a movably mounted releasing device controlling said locking device, and an adjustable contact member carried by said releasing device and controlled by the feeding blank.

27. A device for simultaneously turning and threading bolt-blanks comprising a turning cutter, a threading cutter arranged to operate upon the blank as it comes from the turning cutter, said threading cutter being movable relatively to said turning cutter to compensate for variations between the threading and turning feeds, and a reducing cutter mounted to move with said threading cutter and to operate in advance thereof.

28. A device for simultaneously turning and threading bolt-blanks comprising a turning cutter, a threading cutter arranged to operate upon the blank as it comes from the turning cutter, said threading cutter being movable relatively to said turning cutter to compensate for variations between the threading and turning feeds, means for throwing said threading cutter in and out, a reducing cutter mounted to move with said threading cutter and to operate in advance thereof, and means for throwing said reducing cutter in and out.

In testimony whereof I affix my signature in presence of two witnesses.

COLUMBUS K. LASSITER.

Witnesses:
 JOHN L. FLETCHER,
 C. C. HINES.